(12) United States Patent
Orlitzky (10) Patent No.: US 11,079,065 B2
(45) Date of Patent: Aug. 3, 2021

(54) CONTROLLING AT LEAST ONE LUBRICATION APPARATUS ACCORDING TO WHETHER VIBRATION SATISFIES ONE OF A PLURALITY OF DIFFERENT CRITERIA

(71) Applicant: Stephania Holdings Inc., Delta (CA)

(72) Inventor: Stephan Karl Orlitzky, Delta (CA)

(73) Assignee: STEPHANIA HOLDINGS INC., Delta (CA)

( * ) Notice: Subject to any disclaimer, the term of this patent is extended or adjusted under 35 U.S.C. 154(b) by 129 days.

(21) Appl. No.: 16/335,964

(22) PCT Filed: Sep. 21, 2017

(86) PCT No.: PCT/CA2017/051113
§ 371 (c)(1),
(2) Date: Mar. 22, 2019

(87) PCT Pub. No.: WO2018/053636
PCT Pub. Date: Mar. 29, 2018

(65) Prior Publication Data
US 2020/0025333 A1    Jan. 23, 2020

Related U.S. Application Data

(60) Provisional application No. 62/398,372, filed on Sep. 22, 2016.

(51) Int. Cl.
*F16N 29/02*   (2006.01)
*G05B 19/042*  (2006.01)

(52) U.S. Cl.
CPC .......... *F16N 29/02* (2013.01); *G05B 19/042* (2013.01); *F16N 2270/20* (2013.01); *G05B 2219/34215* (2013.01)

(58) Field of Classification Search
CPC ..... H02J 3/28; H02J 3/003; H02J 3/32; G05B 13/048
See application file for complete search history.

(56) References Cited

U.S. PATENT DOCUMENTS

| 1,483,535 A | 2/1924 | van Orsdale |
| 3,129,347 A | 4/1964 | Tognola |

(Continued)

FOREIGN PATENT DOCUMENTS

| CA | 2 387 078 A1 | 2/2002 | |
| CA | 2387078 A1 * | 2/2002 | ............... B61K 3/00 |

(Continued)

OTHER PUBLICATIONS

International Search Report and Written Opinion of the International Searching Authority dated Jan. 2, 2018 in related International Application No. PCT/CA2017/051113 (eleven pages).

(Continued)

*Primary Examiner* — Thomas C Lee
*Assistant Examiner* — Michael Tang
(74) *Attorney, Agent, or Firm* — Kilpatrick Townsend & Stockton LLP (57) ABSTRACT

A method of controlling at least one lubrication apparatus involves: determining whether vibration associated with the at least one lubrication apparatus satisfies one of a plurality of different criteria; and controlling the at least one lubrication apparatus according to whether the vibration associated with the at least one lubrication apparatus satisfies the one of the plurality of different criteria.

20 Claims, 7 Drawing Sheets

(56) References Cited

U.S. PATENT DOCUMENTS

| | | | |
|---|---|---|---|
| 3,741,344 A | 6/1973 | Kohl et al. | |
| 4,326,603 A | 4/1982 | Darrow et al. | |
| 4,537,285 A | 8/1985 | Brown et al. | |
| 4,904,163 A * | 2/1990 | Tachi | F01M 3/02 184/33 |
| 5,248,861 A | 9/1993 | Kato et al. | |
| 5,711,615 A * | 1/1998 | Stitz | F16N 7/385 384/473 |
| 5,971,107 A | 10/1999 | Stitz et al. | |
| 6,105,724 A | 8/2000 | Stitz et al. | |
| 6,600,328 B2 | 7/2003 | Ku | |
| 6,832,518 B1 | 12/2004 | Berstis | |
| 7,000,734 B2 | 2/2006 | Nawamoto et al. | |
| 7,140,468 B2 | 11/2006 | Rake et al. | |
| 2003/0102188 A1 | 6/2003 | Gunacker et al. | |
| 2004/0250623 A1 * | 12/2004 | Walker | F16C 33/102 73/593 |
| 2006/0165328 A1 | 7/2006 | Ueno et al. | |
| 2007/0144834 A1 | 6/2007 | Matzan | |
| 2009/0320227 A1 * | 12/2009 | Cohen | G04F 1/005 15/167.1 |
| 2010/0147627 A1 | 6/2010 | Lakomiak et al. | |
| 2011/0253480 A1 | 10/2011 | Goodman | |
| 2013/0304312 A1 | 11/2013 | Dorr et al. | |
| 2014/0209413 A1 * | 7/2014 | Orlitzky | F03D 80/70 184/4 |
| 2014/0210393 A1 | 7/2014 | Kanekawa et al. | |
| 2014/0238742 A1 | 8/2014 | Borek et al. | |
| 2017/0045040 A1 | 2/2017 | Czichowski et al. | |
| 2020/0126829 A1 * | 4/2020 | Matsui | G05B 23/0283 |

FOREIGN PATENT DOCUMENTS

| | | |
|---|---|---|
| CN | 102116408 A | 7/2011 |
| DE | 44 04 301 A1 | 8/1995 |
| EP | 0 625 698 A2 | 11/1994 |
| EP | 0 854 314 A2 | 7/1998 |
| EP | 1 538 357 A1 | 6/2005 |
| EP | 2 199 654 A1 | 6/2010 |
| GB | 923299 | 4/1963 |
| GB | 2463948 A | 4/2010 |
| JP | 2003028664 A * | 1/2003 |
| KR | 10-0741820 B1 | 7/2007 |
| SE | 426 733 B | 2/1983 |
| TW | 201319445 A1 | 5/2013 |
| WO | 2015/074726 A1 | 5/2015 |

OTHER PUBLICATIONS

European Search Report dated May 8, 2020 for corresponding application EP17852033.4, 8 pages.

* cited by examiner

| Designator | Comment | Description | Manufacturer | Manufacturer Number | Substitutable? | Quantity |
|---|---|---|---|---|---|---|
| C1 | 0.1uF | Capacitor | Cal-Chip | GMC21X7R104K50NTLF | Yes | 1 |
| C2, C3 | 0.01uF | Capacitor | Kemet | C0805C103K5RACTU | Yes | 2 |
| C4 | 0.001uF | Capacitor | Kemet | C0805C102K5RACTU | Yes | 1 |
| C5 | 0.0001uF | Capacitor | Kemet | C0805C101K5RACTU | Yes | 1 |
| D1 | SML-211UTT86 | Red LED | Rohm Semiconductor | SML-211UTT86 | Yes | 1 |
| D2 | MMBD4148SE | | Fairchild Semiconductor | MMBD4148SE | Yes | 1 |
| J1 | SM 3Pin | Connector | Sulling Connector Solution | PPPC031LFBN-RC | No | 1 |
| Q1 | BSS138L | N Channel Mosfet | Fairchild Semiconductor | BSS138L | Yes | 1 |
| R1 | 1K | Resistor | Yageo | RC0805FR-071KL | Yes | 1 |
| R2 | 2M49 | Resistor | Yageo | RC0805FR-072M49L | Yes | 1 |
| R3 | 220R | Resistor | Chip Technologies Inc | CR0805F2210T1LF | Yes | 1 |
| R5 | 30M | Resistor | Rohm | KTR10EZPJ306 | Yes | 1 |
| S1 | SW-SP3T | | Copal Electronics Inc. | CL-SB-13B-01T | No | 1 |
| S2 | SW SPST | | C&K Components | SDA01H1SBD | No | 1 |
| U? | SN74AHC1G14DBVR | Single Schmitt-trigger inverting buffer. | Texas Instruments | SN17AHC1G14DBVR | Yes | 1 |
| VB1 | SEN-200 | SEN-200 Vibration Sensor | SignalQuest | SQ-SEN-200-ICT | No | 1 |

CONTROLLING AT LEAST ONE LUBRICATION APPARATUS ACCORDING TO WHETHER VIBRATION SATISFIES ONE OF A PLURALITY OF DIFFERENT CRITERIA

RELATED APPLICATIONS

This application is a U.S. National Phase Application of PCT/CA2017/051113, filed Sep. 21, 2017, which claims the priority of U.S. Provisional Application No. 62/398,372, filed Sep. 22, 2016, the entireties of which are incorporated by reference herein.

FIELD

This disclosure relates generally to control of at least one lubrication apparatus.

BACKGROUND

Some lubrication apparatuses may automatically lubricate machinery, for example. However, at least some such machinery may require more or less lubrication at different times, and such lubrication apparatuses may not respond accordingly. Therefore, such lubrication apparatuses may dispense more or less lubricant than such machinery actually requires.

SUMMARY

According to one embodiment, there is disclosed a method of controlling at least one lubrication apparatus, the method comprising: determining whether vibration associated with the at least one lubrication apparatus satisfies one of a plurality of different criteria; and controlling the at least one lubrication apparatus according to whether the vibration associated with the at least one lubrication apparatus satisfies the one of the plurality of different criteria.

In some embodiments, the vibration associated with the at least one lubrication apparatus is vibration of the at least one lubrication apparatus.

In some embodiments, the vibration associated with the at least one lubrication apparatus is vibration measured proximate the at least one lubrication apparatus.

In some embodiments, the plurality of different criteria comprises three different criteria.

In some embodiments, the plurality of different criteria consists of three different criteria.

In some embodiments, controlling the at least one lubrication apparatus comprises, after determining that the vibration associated with the at least one lubrication apparatus satisfies the one of the plurality of different criteria, causing the at least one lubrication apparatus to dispense lubricant.

In some embodiments, controlling the at least one lubrication apparatus further comprises, after causing the at least one lubrication apparatus to dispense the lubricant, waiting for a lubrication cycle time period to expire.

In some embodiments, controlling the at least one lubrication apparatus further comprises, after the lubrication cycle time period expires, determining whether further vibration, associated with the at least one lubrication apparatus and measured after causing the at least one lubrication apparatus to dispense the lubricant, satisfies the one of the plurality of different criteria.

In some embodiments, controlling the at least one lubrication apparatus further comprises, in response to determining that the further vibration satisfies the one of the plurality of different criteria, causing the at least one lubrication apparatus to dispense further lubricant.

In some embodiments, controlling the at least one lubrication apparatus further comprises, after causing the at least one lubrication apparatus to dispense the further lubricant, repeating: waiting for the lubrication cycle time period to expire; after the lubrication cycle time period expires, determining whether further vibration, associated with the at least one lubrication apparatus and measured after causing the at least one lubrication apparatus to dispense the further lubricant, satisfies the one of the plurality of different criteria; and in response to determining that the further vibration satisfies the one of the plurality of different criteria, causing the at least one lubrication apparatus to dispense further lubricant.

In some embodiments, controlling the at least one lubrication apparatus further comprises, in response to determining that the further vibration does not satisfy the one of the plurality of different criteria, waiting for the further vibration to satisfy the one of the plurality of different criteria.

In some embodiments, controlling the at least one lubrication apparatus further comprises, in response to determining that the further vibration does not satisfy the one of the plurality of different criteria, waiting for the further vibration to satisfy the one of the plurality of different criteria.

In some embodiments, the plurality of different criteria are associated with respective different numbers of measured vibrations associated with the at least one lubrication apparatus.

In some embodiments, determining whether the vibration associated with the at least one lubrication apparatus satisfies the one of the plurality of different criteria comprises determining whether a number of measured vibrations associated with the at least one lubrication apparatus satisfies the one of the plurality of different criteria.

In some embodiments, the method further comprises measuring the number of measured vibrations associated with the at least one lubrication apparatus.

In some embodiments, measuring the number of measured vibrations associated with the at least one lubrication apparatus comprises measuring an electrical charge accumulated in response to the number of measured vibrations associated with the at least one lubrication apparatus.

In some embodiments, measuring the electrical charge accumulated in response to the number of measured vibrations associated with the at least one lubrication apparatus comprises measuring an electrical voltage across a capacitor associated with the one of the plurality of different criteria.

In some embodiments, the method further comprises configuring at least one electrical circuit to determine whether the vibration associated with the at least one lubrication apparatus satisfies the one of the plurality of different criteria. Such configuration may involve selecting or identifying the one of the plurality of different criteria.

In some embodiments, configuring the at least one electrical circuit to determine whether the vibration associated with the at least one lubrication apparatus satisfies the one of the plurality of different criteria comprises causing a switch to connect the capacitor to a source of the electrical charge.

In some embodiments, measuring the electrical charge accumulated in response to the number of measured vibrations associated with the at least one lubrication apparatus comprises measuring the electrical charge accumulated from a vibration sensor in response to the number of measured vibrations associated with the at least one lubrication apparatus.

In some embodiments, the method further comprises configuring at least one electrical circuit to determine whether the vibration associated with the at least one lubrication apparatus satisfies the one of the plurality of different criteria. Such configuration may involve selecting or identifying the one of the plurality of different criteria.

According to another embodiment, there is disclosed a circuit configured to implement the method.

According to another embodiment, there is disclosed a circuit configured to implement the method and comprising a source of the electrical charge.

In some embodiments, the source of the electrical charge comprises a vibration sensor.

In some embodiments, the circuit further comprises a switch usable to select the one of the plurality of different criteria.

In some embodiments, the circuit further comprises a switch configured to direct the electrical charge from the source of the electrical charge to one of a plurality of capacitors associated with respective ones of the plurality of different criteria to select the one of the plurality of different criteria.

According to another embodiment, there is disclosed an apparatus for controlling at least one lubrication apparatus, the apparatus comprising: a means for determining whether vibration associated with the at least one lubrication apparatus satisfies one of a plurality of different criteria; and a means for controlling the at least one lubrication apparatus according to whether the vibration associated with the at least one lubrication apparatus satisfies the one of the plurality of different criteria.

Other aspects and features will become apparent to those ordinarily skilled in the art upon review of the following description of illustrative embodiments in conjunction with the accompanying figures.

DETAILED DESCRIPTION

Figure 1:
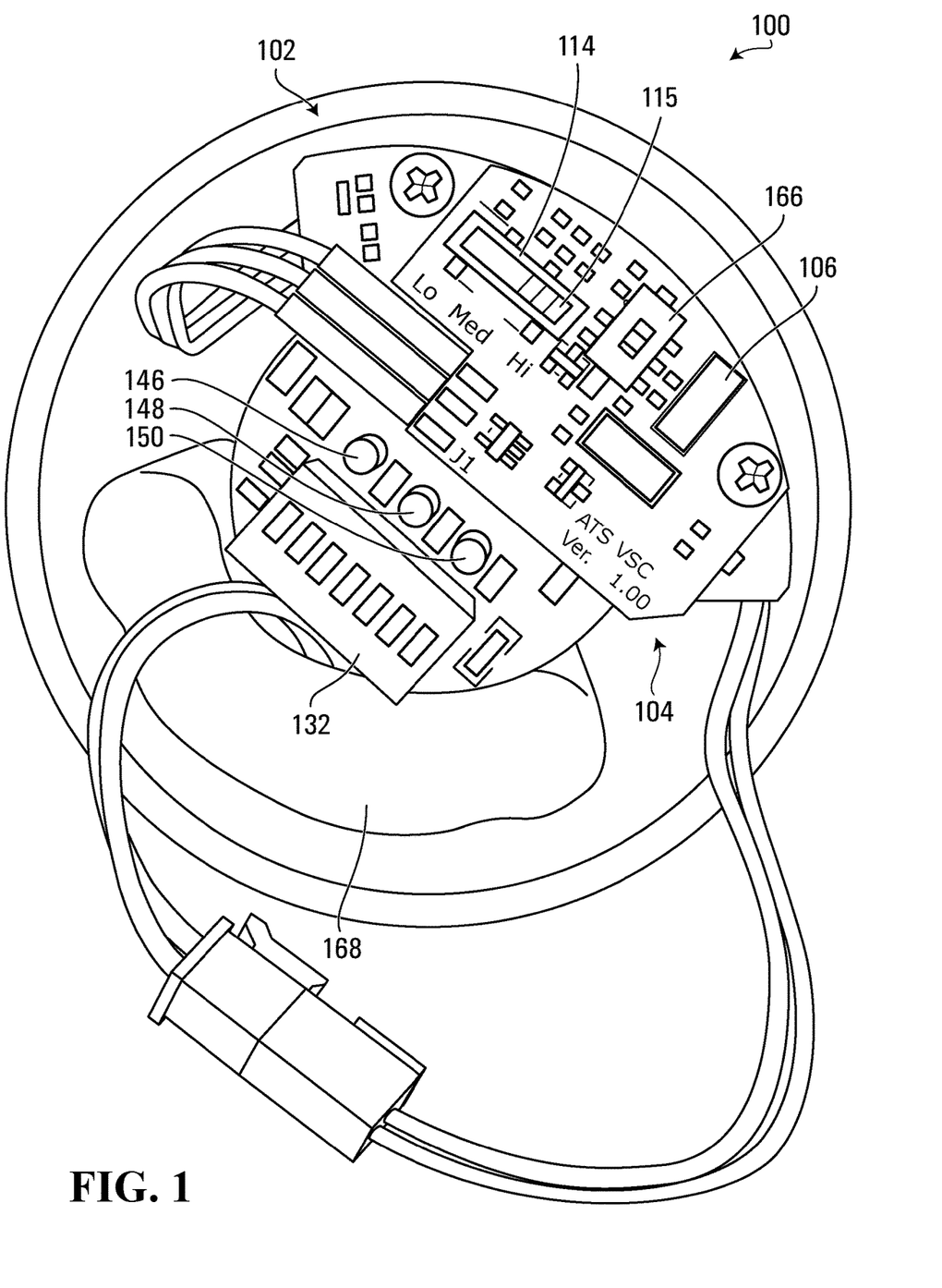
FIG. 1 illustrates a lubricator assembly according to one embodiment.

Referring to FIG. 1, a lubricator assembly according to one embodiment is shown generally at 100 and includes a lubricator apparatus 102 and a lubricator control circuit 104. The lubricator apparatus 102 may include one or more lubricant dispensers such as an ELECTRO-LUBER™ lubricant dispenser, an ULTIMATE LUBER™ lubricant dispenser, a TITAN CL LUBER™ lubricant dispenser, a TITAN OILER 2000™ lubricant dispenser, or a JACK LUBER™ lubricant dispenser, all available from A.T.S. Electro-Lube International Inc. of Delta, British Columbia, Canada, for example. The lubricator apparatus 102 in the embodiment shown is an example only, and alternative embodiments may include one or more different lubricator apparatuses.

Figure 2:
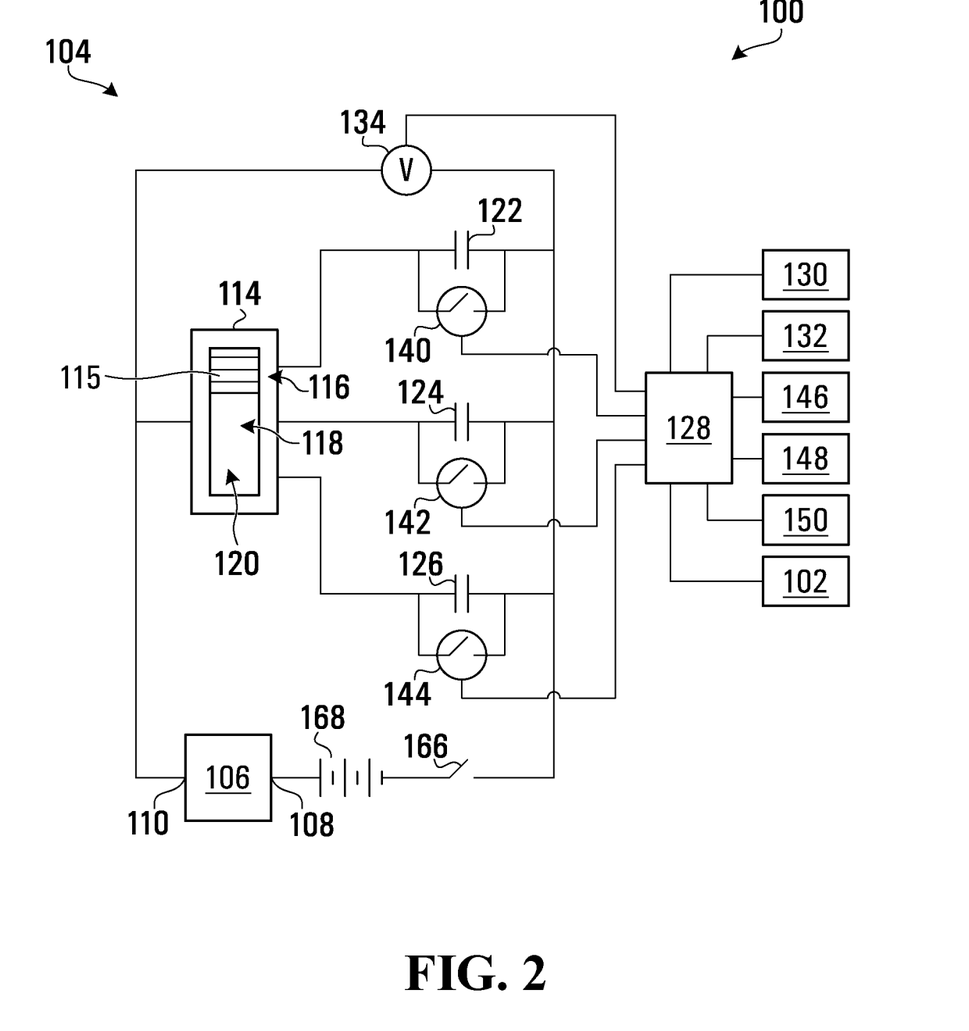
FIG. 2 schematically illustrates the lubricator assembly of FIG. 1.

Referring to FIG. 2, the lubricator assembly 100 is illustrated schematically, and the lubricator control circuit 104 includes a vibration sensor 106. The vibration sensor 106 is identified by part number SQ-SEN-200-ICT and available from SignalQuest, LLC of Lebanon, N.H., United States of America. Movement of the vibration sensor 106 controls an electrical switch between terminals 108 and 110 of the vibration sensor 106 such that the electrical switch closes in response to movement of the vibration sensor 106. However, the vibration sensor 106 in the embodiment shown is an example only, and alternative embodiments may include one or more different vibration sensors. For example, other embodiments may include a piezoelectric sensor and a rectifier that may generate rectified current but otherwise function generally as described below. In the embodiment shown, the vibration sensor 106 is integrated into the lubricator assembly 100, but in alternative embodiments one or more vibration sensors may be integrated into or physically separate from a lubricator assembly. Vibration sensors that are physically separate from a lubricator assembly may measure vibration that is proximate or otherwise associated with the lubricator assembly.

When a power switch 166 is closed, one or more batteries 168 may supply current to the terminal 108, and the terminal 110 is in electrical communication with a switch 114 to communicate electrical current from the one or more batteries 168 to the switch 114 when the power switch 166 is closed and when the electrical switch of the vibration sensor 106 is closed in response to movement of the vibration sensor 106. The switch 114 includes a switch actuator 115 that may be positioned in any one of three different positions shown generally at 116, 118, and 120. When the switch actuator 115 is positioned in the position 116, the switch 114 communicates electrical current from the vibration sensor 106 to a capacitor 122. When the switch actuator 115 is positioned in the position 118, the switch 114 communicates electrical current from the vibration sensor 106 to a capacitor 124. When the switch actuator 115 is positioned in the position 120, the switch 114 communicates electrical current from the vibration sensor 106 to a capacitor 126. The capacitors 122, 124, and 126 have respective different capacitances, and are in electrical communication with the vibration sensor 106 to form a circuit as shown in FIG. 2. However, the circuit shown in FIG. 2 is an example only, and alternative embodiments may include different circuits that, for example, may include one or more resistors, one or more variable resistors, one or more diodes in a rectifier or otherwise, one or more variable capacitors, more or fewer capacitors, one or more alternatives to the switch 114, or a combination of two or more thereof.

The lubricator control circuit 104 also includes a processor circuit including a microprocessor 128, which is in communication with program memory 130 and may receive power from the one or more batteries 168 or from an alternate source, for example. The program memory 130 stores program codes that, when executed by the microprocessor 128, generally direct the microprocessor 128 to control at least one lubrication apparatus as described herein. The program memory may include one or more known computer-readable and computer-writable memories, such as random-access memory ("RAM") or read-only memory ("ROM"), for example. However, the microprocessor 128 and the program memory 130 are an example only, and alternative embodiments may include one or more alternatives such as an application specific integrated circuit ("ASIC") or other known processor circuits or other circuits, for example. As another example, in some embodiments, the program memory 130 may be integrated into the microprocessor 128 such that the microprocessor 128 may be programmed to function as described herein without any external or additional memory.

The microprocessor 128 is also in communication with a dual in-line package ("DIP") switch assembly 132 including various switches that may be used to configure a lubrication cycle time period. In some embodiments, the lubrication cycle time period may be configured, using switches of the DIP switch assembly 132 to select the lubrication cycle time period from a plurality of selectable lubrication cycle time periods, which may range, for example, from four hours to 90 days, and may include four hours, eight hours, 12 hours, 24 hours, seven days, 15 days, 30 days, 60 days, 90 days, or a combination of two or more thereof, for example. Again, the DIP switch assembly 132 is an example only, and alternative embodiments may include one or more alternatives to the DIP switch assembly 132 that may be used to configure a lubrication cycle time period. Still other embodiments may omit the DIP switch assembly 132 so that a lubrication cycle time period may be fixed or variable in one or more other ways.

The microprocessor 128 is also in communication with a voltmeter 134, which measures a voltage across the one of the capacitors 122, 124, and 126 that is connected to the vibration sensor 106. Again, alternative embodiments may measure voltage of one or more capacitors in one or more other ways, or may include yet other alternatives to the voltmeter 134.

The microprocessor 128 is also in communication with a switch 140, which the microprocessor 128 can cause to open or close, and which discharges the capacitor 122 when closed. The microprocessor 128 is also in communication with a switch 142, which the microprocessor 128 can cause to open or close, and which discharges the capacitor 124 when closed. The microprocessor 128 is also in communication with a switch 144, which the microprocessor 128 can cause to open or close, and which discharges the capacitor 126 when closed. Again, alternative embodiments may include one or more alternatives to the switches 140, 142, and 144 or may discharge one or more capacitors in one or more other ways.

For example, one embodiment may include one or more Schmitt triggers that may generate a signal when voltage across the one of the capacitors 122, 124, and 126 that is connected to the vibration sensor 106 exceeds a threshold voltage, and such one or more Schmitt triggers may also be involved in discharging the one or more of the capacitors 122, 124, and 126 when the threshold voltage is exceeded.

The microprocessor 128 is also in communication with light-emitting diodes ("LEDs") 146, 148, and 150, which may have the same colors or different colors, and which the microprocessor 128 may independently turn on or off. In some embodiments, one or more of the LEDs 146, 148, and 150 may indicate a measurement of vibration from the vibration sensor 106. Again, alternative embodiments may include one or more alternatives to the LEDs 146, 148, and 150, or may omit the LEDs 146, 148, and 150.

The lubricator assembly 100 may include a power switch 166 to conserve power of the one or more batteries 168 if the lubricator assembly 100 is not in use.

As indicated above, in the embodiment shown, movement of the vibration sensor 106 causes a switch of the vibration sensor 106 to close, which may allow current to flow between the terminals 108 and 110 for a short period of time in response to movement of the vibration sensor 106. After each such short period of time, the switch of the vibration sensor 106 may open again. The vibration sensor 106 may thus function as a source of electrical charge in response to movement of the vibration sensor 106. Further, because the switch of the vibration sensor 106 may close for a short period of time and then open again in response to movement of the vibration sensor 106, a charge that passes between the terminals 108 and 110 during a period of time may be proportionate to a number of times that the vibration sensor 106 vibrates or otherwise moves during that period of time. The position of the switch actuator 115 connects the vibration sensor 106 to one of the capacitors 122, 124, and 126, and the one of the capacitors 122, 124, and 126 accumulates electrical charge each time the vibration sensor 106 moves. The one of the capacitors 122, 124, and 126 therefore accumulates electrical charge in an amount that generally represents a number of times that the vibration sensor 106 has moved, and accumulated charge at the one of the capacitors 122, 124, and 126 therefore represents a measurement of the number of times that the vibration sensor 106 has moved.

In general, voltage across a capacitor is proportionate to charge at the capacitor. Also, in general, voltage across a capacitor is inversely proportional to the capacitance of the capacitor. As indicated above, the capacitors 122, 124, and 126 have respective different capacitances. Therefore, a given voltage across the capacitors 122, 124, and 126 represents a different charge at the capacitors 122, 124, and 126 and therefore represents a different number of times that the vibration sensor 106 has moved. For example, in the embodiment shown, the capacitance of the capacitor 122 is greater than the capacitance of the capacitor 124, and the capacitance of the capacitor 124 is greater than the capacitance of the capacitor 126. Therefore, in the embodiment shown, a voltage across the capacitor 122 represents a smaller number of times that the vibration sensor 106 has moved than the same voltage across the capacitor 124, and a voltage across the capacitor 124 represents a smaller number of times that the vibration sensor 106 has moved than the same voltage across the capacitor 126.

In the embodiment shown, a given voltage across the capacitors 122, 124, and 126 represents different numbers of times that the vibration sensor 106 has moved, and more generally represents different criteria of vibration associated with the lubricator apparatus 102. In other words, in the embodiment shown, a voltage across the capacitor 122 represents a number of times that the vibration sensor 106 has moved and thus represents one criterion, the same voltage across the capacitor 124 represents a different number of times that the vibration sensor 106 has moved and thus represents a different criterion, and the same voltage across the capacitor 126 represents another different number of times that the vibration sensor 106 has moved and thus represents another different criterion. In alternative embodiments, other types of criteria may include number of vibrations, magnitude of vibrations, frequency of vibrations, or a combination of two or more thereof.

In summary, selecting a position of the switch actuator 115 connects the vibration sensor 106 to one of the capacitors 122, 124, and 126 associated with the selected position of the switch actuator 115, and connecting the vibration sensor 106 to the one of the capacitors 122, 124, and 126 will cause the one of the capacitors 122, 124, and 126 to reach a given voltage after a number of times that the vibration sensor 106 has moved, and that number depends on which one of the capacitors 122, 124, and 126 is selected by the position of the switch actuator 115. If the capacitor 122 is connected to the vibration sensor 106, then a given voltage detected by the voltmeter 134 (or, in some embodiments, the given voltage detected by one or more Schmitt triggers) indicates that the vibration sensor 106 has vibrated a number of times that is associated with the capacitance of the capacitor 122. If the capacitor 124 is connected to the vibration sensor 106, then a given voltage detected by the voltmeter 134 (or, in some embodiments, the given voltage detected by one or more Schmitt triggers) indicates that the vibration sensor 106 has vibrated a number of times that is associated with the capacitance of the capacitor 124, which is different from the number of times that is associated with the capacitance of the capacitor 122. If the capacitor 126 is connected to the vibration sensor 106, then a given voltage detected by the voltmeter 134 (or, in some embodiments, the given voltage detected by one or more Schmitt triggers) indicates that the vibration sensor 106 has vibrated a number of times that is associated with the capacitance of the capacitor 126, which is different from the number of times that is associated with the capacitance of the capacitor 122 and different from the number of times that is associated with the capacitance of the capacitor 124.

Accordingly, when the voltmeter 134 (or, in some embodiments, one or more Schmitt triggers) detects a given voltage at one of the capacitors 122, 124, and 126, the microprocessor 128 can determine that the vibration sensor 106 has vibrated a number of times that is associated with the capacitance of the one of the capacitors 122, 124, and 126 that is connected to the vibration sensor 106. More generally, when the voltmeter 134 (or, in some embodiments, one or more Schmitt triggers) detects a given voltage, the microprocessor 128 can determine that vibration of the vibration sensor 106 satisfies one criterion (namely the number of times that is associated with the capacitance of the one of the capacitors 122, 124, and 126 that is connected to the vibration sensor 106) of a plurality of criteria (namely the criteria associated with the capacitors 122, 124, and 126 as described above). As indicated above, alternative embodiments may include different types of criteria, and alternative embodiments may include more or fewer than three criteria. Further, selecting a position of the switch actuator 115 identifies or selects one of the plurality of criteria.

Figure 3:
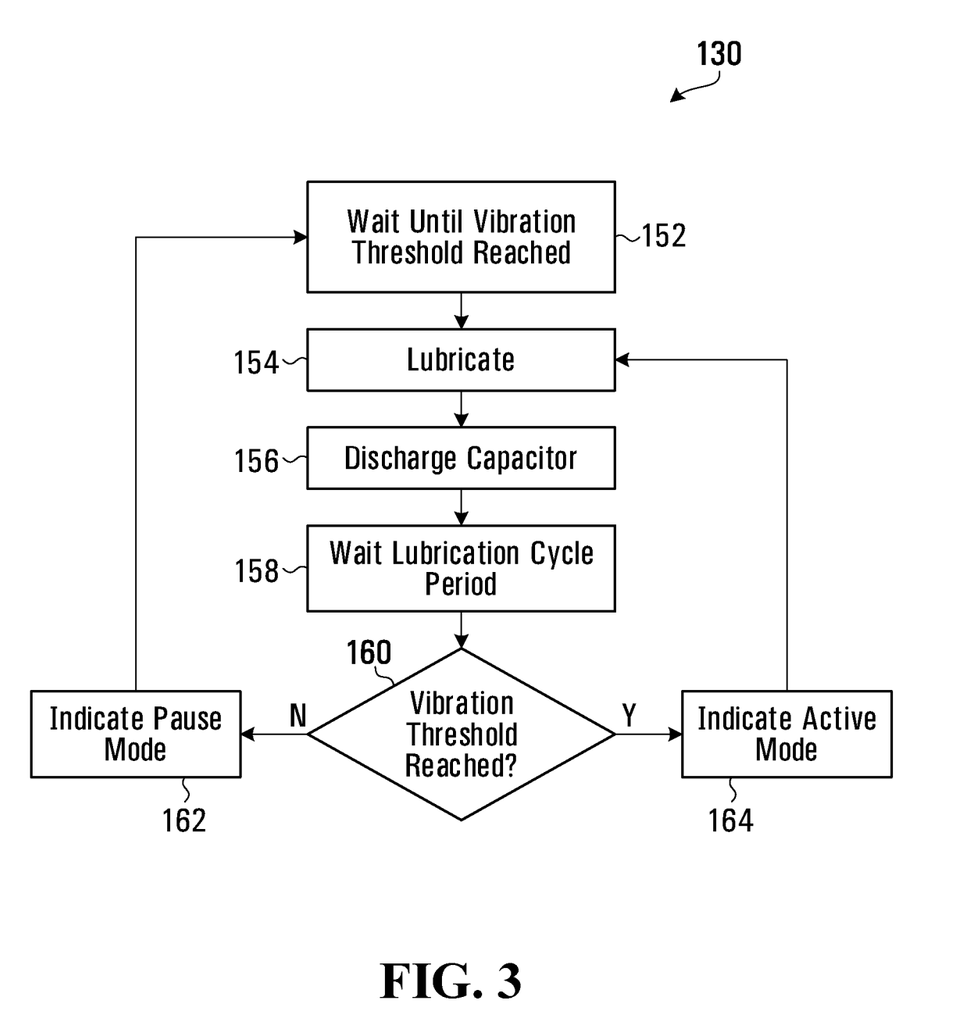
FIG. 3 schematically illustrates blocks of code in a program memory of the lubricator assembly of FIG. 1.
Figure 4:
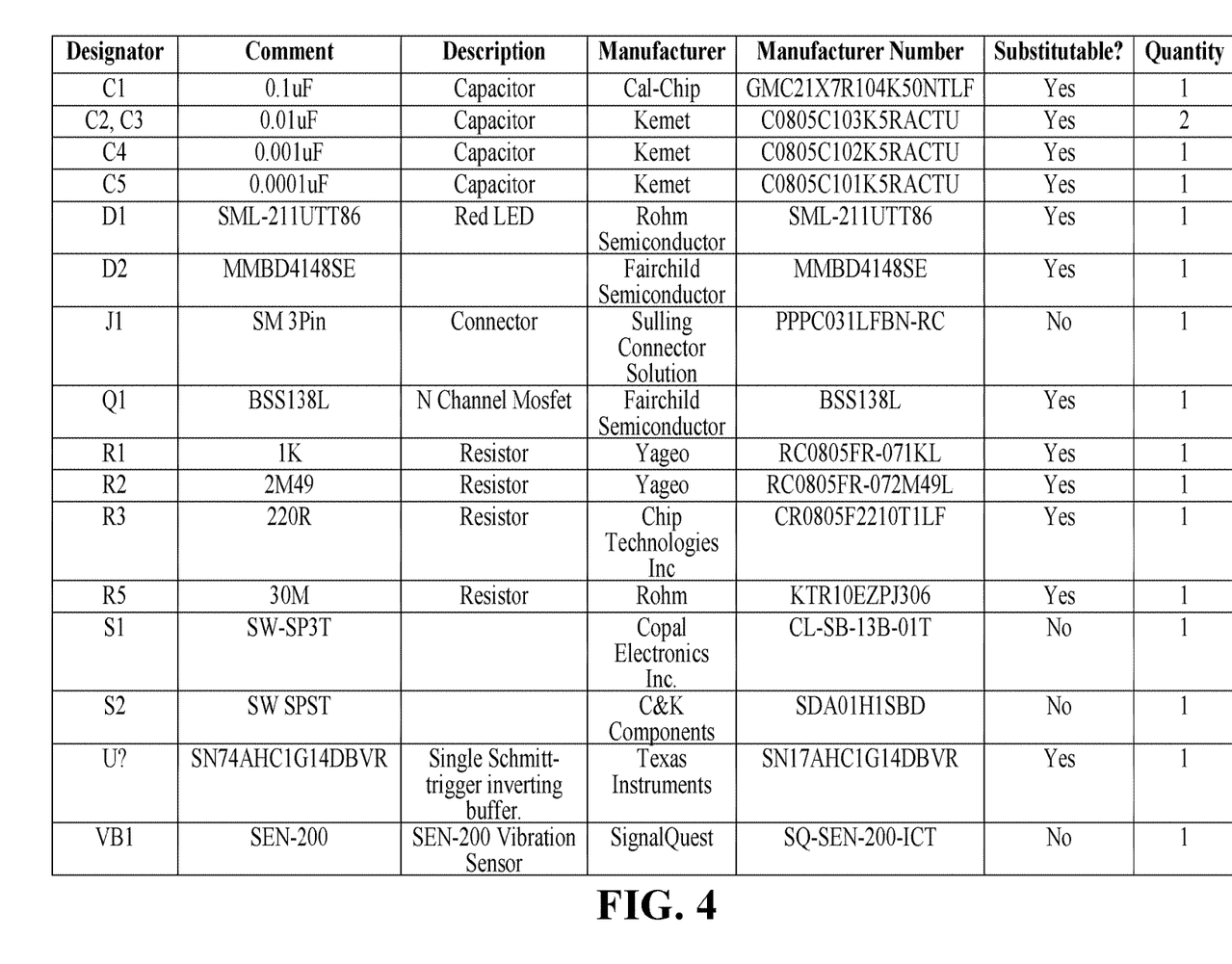
FIG. 4 illustrates a list of parts that may be included in a lubricator assembly according to one embodiment.
Figure 5:
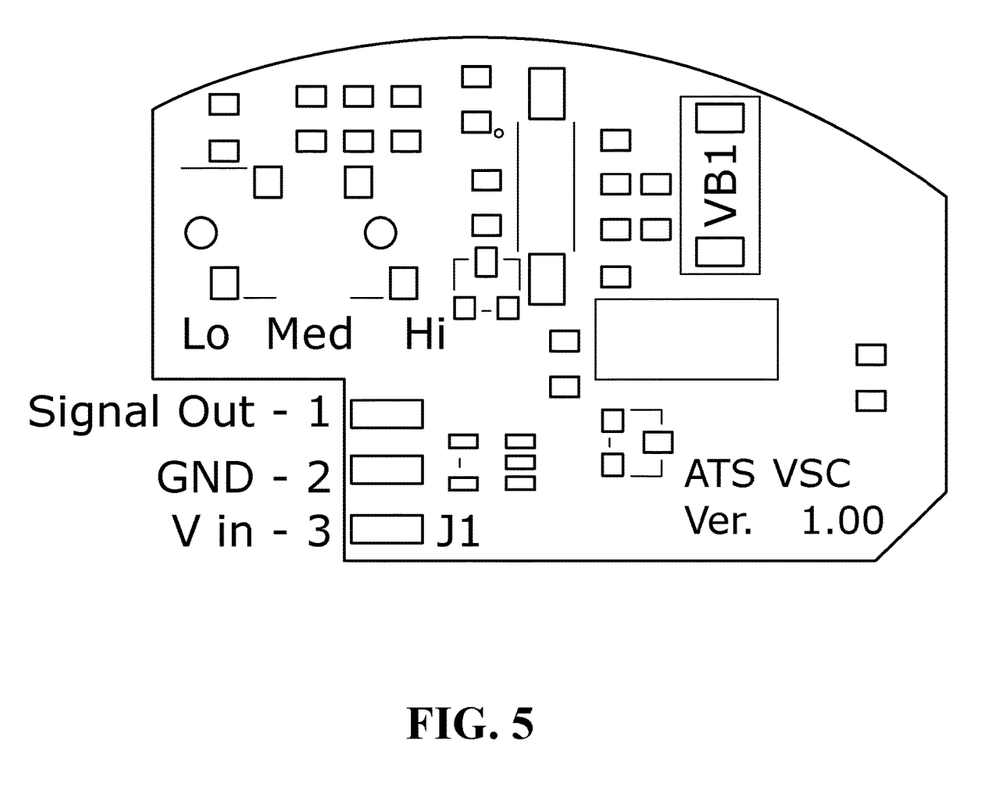
FIG. 5 illustrates an assembly drawing of the lubricator assembly of FIG. 4.
Figure 6:
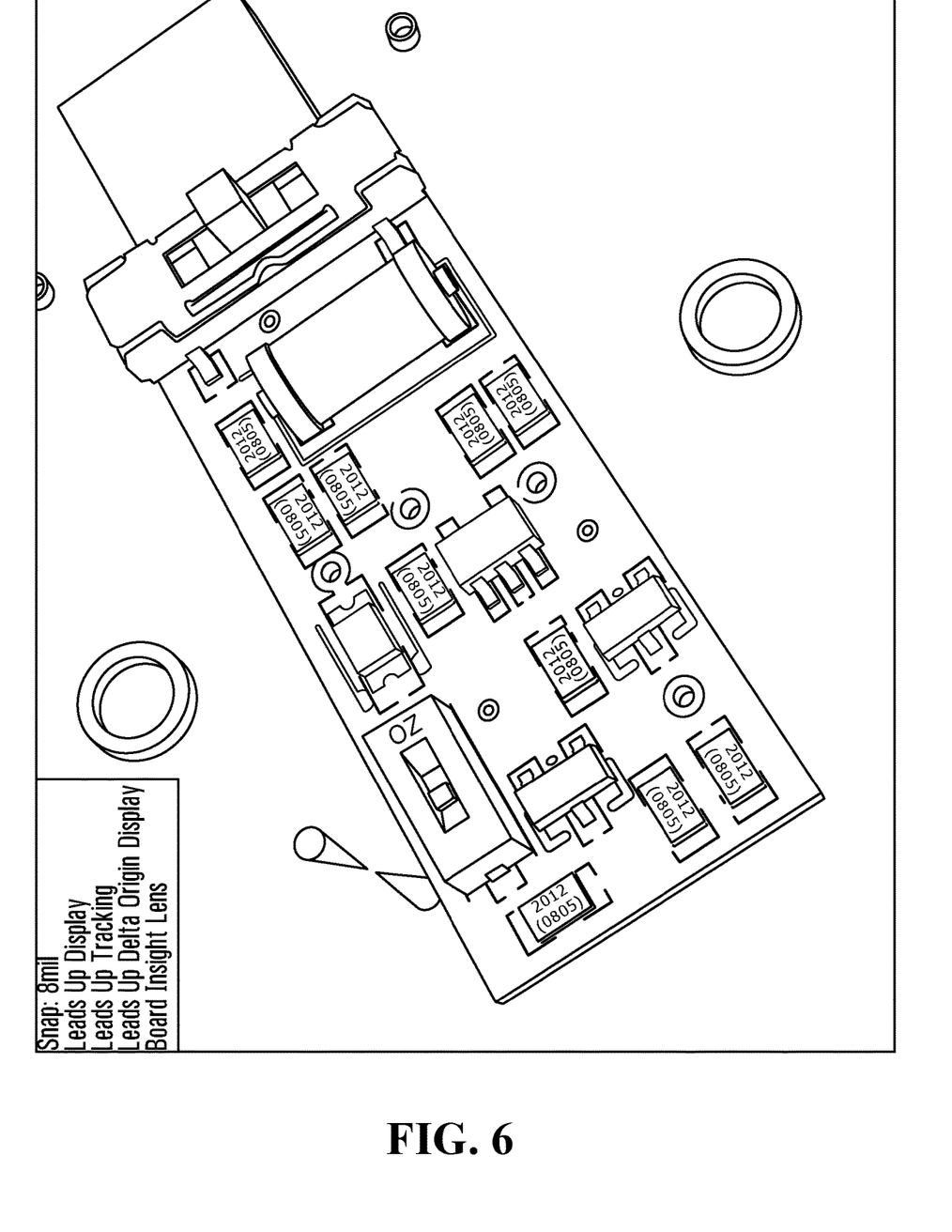
FIG. 6 illustrates a lubricator assembly according to another embodiment.
Figure 7:
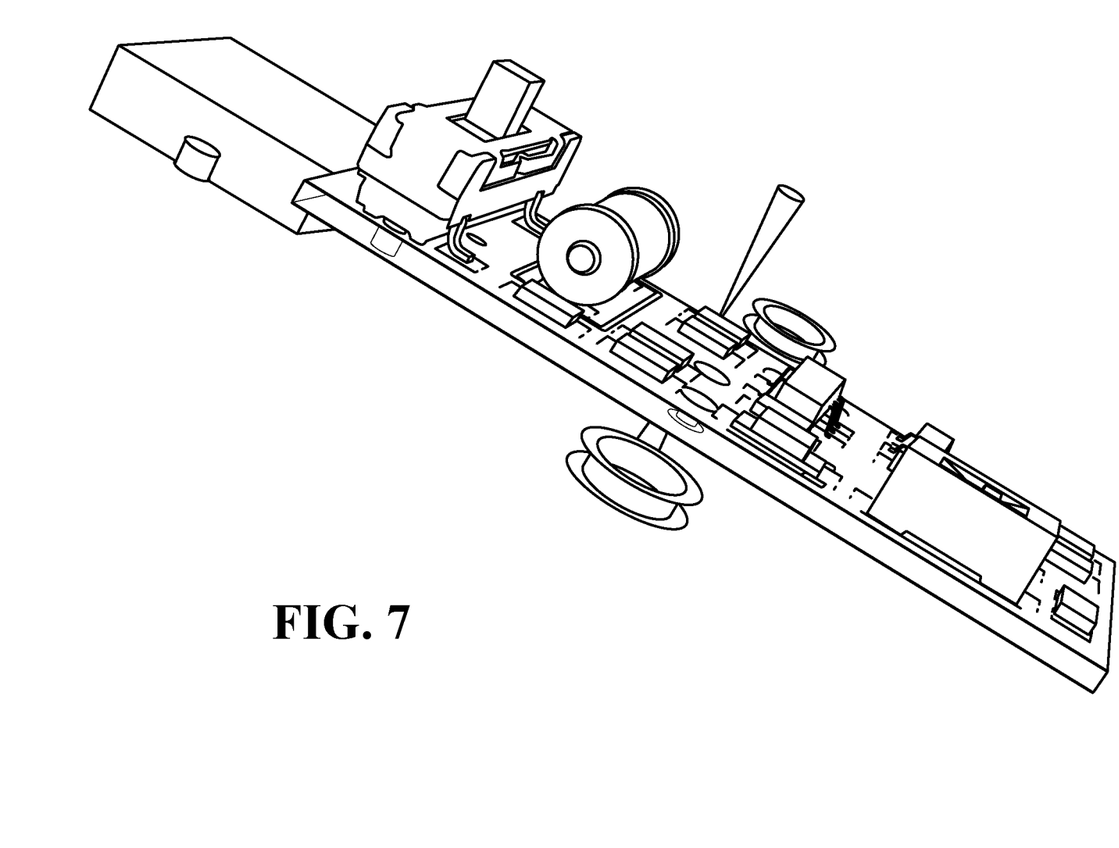
FIG. 7 also illustrates the lubricator assembly of FIG. 6.

Referring to FIG. 3, program codes in the program memory 130 may include blocks of code that are illustrated schematically in FIG. 3. The program codes in the program memory 130 include a block 152, which includes codes that, when executed by the microprocessor 128, direct the microprocessor 128 to wait until a vibration threshold is reached. In the embodiment shown, the codes at block 152 direct the microprocessor 128 to wait until the voltmeter 134 reaches a given voltage (or, in some embodiments, one or more Schmitt triggers detects the given voltage) such as a threshold voltage for example.

After block 152, the program codes in the program memory 130 continue at block 154, which includes codes that, when executed by the microprocessor 128, direct the microprocessor 128 to cause the lubricator apparatus 102 to dispense lubricant.

After block 154, the program codes in the program memory 130 continue at block 156, which includes codes that, when executed by the microprocessor 128, direct the microprocessor 128 to close temporarily the switches 140, 142, and 144 to discharge the capacitors 122, 124, and 126, and then to reopen the switches 140, 142, and 144 to allow the capacitors 122, 124, and 126 to accumulate charge again.

As indicated above, some embodiments may discharge the capacitors automatically, for example in response to one or more Schmitt triggers detecting a threshold voltage for example After block 156, the program codes in the program memory 130 continue at block 158, which includes codes that, when executed by the microprocessor 128, direct the microprocessor 128 to wait until a lubrication cycle period passes. As indicated above, in the embodiment shown, the switches of the DIP switch assembly 132 configure the lubrication cycle time period. However, in alternative embodiments, the lubrication cycle period may be identified in one or more other ways.

After block 158, the program codes in the program memory 130 continue at block 160, which includes codes that, when executed by the microprocessor 128, direct the microprocessor 128 to determine whether the vibration threshold is reached. In the embodiment shown, the codes at block 160 direct the microprocessor 128 to determine whether the voltmeter 134 (or, in some embodiments, one or more Schmitt triggers) measures the given voltage of block 152 (or has measured the given voltage of block 152 since a most recent iteration, if any, of block 160).

If at block 160 the vibration threshold is not reached, then the program codes in the program memory 130 continue at block 162, which includes codes that, when executed by the microprocessor 128, direct the microprocessor 128 to indicate a pause mode. In one embodiment, the codes at block 162 direct the microprocessor 128 to cause at least one of the LEDs 146, 148, and 150 to emit a light sequence of blue, then blue, then green. In alternative embodiments, the pause mode may be indicated in other ways, or other embodiments may omit any indication of the pause mode. After block 162, the program codes in the program memory 130 continue at block 152 as described above.

Alternatively, if at block 160 the vibration threshold is reached, then the program codes in the program memory 130 continue at block 164, which includes codes that, when executed by the microprocessor 128, direct the microprocessor 128 to indicate an active mode. In one embodiment, the codes at block 164 direct the microprocessor 128 to cause at least one of the LEDs 146, 148, and 150 to emit flashing green light. In alternative embodiments, the active mode may be indicated in other ways, or other embodiments may omit any indication of the active mode. After block 164, the program codes in the program memory 130 continue at block 154 as described above.

The program codes in the program memory 130 are an example only, and alternative embodiments may include different program codes or one or more alternatives to the program codes in the program memory 130. For example, in some embodiments, the order of some of the blocks of code in the program memory 130 may vary, or some blocks of code may be added or omitted. Further, in different embodiments, the program codes in the program memory 130 may begin at block 152 or at another block.

In general, the lubricator assembly 100 may function as a Vibration Sensor Control ("VSC") that may control at least one lubrication apparatus according to whether sensed vibration satisfies one of a plurality of different criteria. When in use, the switch 114 may be used to configure the lubricator assembly 100 to a desired level of sensitivity so that lubricator assembly 100 can control the lubricator apparatus 102 in a way that may lubricate machinery when the machinery is in use, but may avoid lubricate the machinery when the machinery is not in use.

For example, in an environment that is relatively motionless or has relatively low ambient vibration, even a small amount of vibration may indicate that machinery is in use. Accordingly, in such an environment, the switch 114 may be configured to connect the vibration sensor 106 to the capacitor 122, which as indicated above in the embodiment shown accumulates a given voltage in response to a smaller number of times that vibration sensor 106 moved than the capacitor 124 and a smaller number of times that vibration sensor 106 moved than the capacitor 126, and therefore measures a criterion that represents relatively high sensitivity. Therefore, when the switch 114 is configured to connect the vibration sensor 106 to the capacitor 122, a relatively small number of measured vibrations will be sufficient to indicate that machinery is operating, and in response to such a relatively small number of measured vibrations, the lubricator control circuit 104 will cause the lubricator apparatus 102 to lubricate the machinery.

However, some other environments may include more ambient vibration, for example if such environments include large machinery or many machines. In an environment of basic or intermediate vibration, the switch 114 may be configured to connect the vibration sensor 106 to the capacitor 124, which as indicated above in the embodiment shown accumulates a given voltage in response to a larger number of times that vibration sensor 106 moved than the capacitor 122 but a smaller number of times that vibration sensor 106 moved than the capacitor 126, and therefore measures a criterion that represents basic or intermediate sensitivity. Therefore, when the switch 114 is configured to connect the vibration sensor 106 to the capacitor 124, an intermediate number of measured vibrations will indicate that machinery is operating, and in response to such an intermediate number of measured vibrations, the lubricator control circuit 104 will cause the lubricator apparatus 102 to lubricate the machinery.

In an environment of relatively high or heavy ambient vibration, the switch 114 may be configured to connect the vibration sensor 106 to the capacitor 126, which as indicated above in the embodiment shown accumulates a given voltage in response to a larger number of times that vibration sensor 106 moved than the capacitor 122 and a larger number of times that vibration sensor 106 moved than the capacitor 124, and therefore measures a criterion that represents relatively low sensitivity. Therefore, when the switch 114 is configured to connect the vibration sensor 106 to the capacitor 126, a relatively high number of measured vibrations will be required to indicate that machinery is operating, and in response to such a relatively high number of measured vibrations, the lubricator control circuit 104 will cause the lubricator apparatus 102 to lubricate the machinery. Accordingly, embodiments such as those described herein may allow selecting a vibration criterion used in controlling at least one lubrication apparatus.

Although specific embodiments have been described and illustrated, such embodiments should be considered illustrative only and not as limiting the invention as construed according to the accompanying claims.

The invention claimed is:

1. A method of controlling at least one lubrication apparatus, the method comprising:
    determining whether a number of measured vibrations associated with the at least one lubrication apparatus satisfies a selected one of a plurality of different criteria of the at least one lubrication apparatus, wherein the plurality of different criteria are associated with respective different threshold numbers of measured vibrations associated with the at least one lubrication apparatus, and wherein the number of measured vibrations associated with the at least one lubrication apparatus satisfies the selected one of the plurality of different criteria when the number of measured vibrations associated with the at least one lubrication apparatus is at least the threshold number of measured vibrations associated with the selected one of the plurality of different criteria; and
    controlling the at least one lubrication apparatus according to whether the number of measured vibrations associated with the at least one lubrication apparatus satisfies the selected one of the plurality of different criteria, wherein controlling the at least one lubrication apparatus comprises:
        waiting for a first lubrication cycle time period to expire;
        after the first lubrication cycle time period expires, determining that the number of measured vibrations, associated with the at least one lubrication apparatus and during the first lubrication cycle time period, is at least the threshold number of measured vibrations associated with the selected one of the plurality of different criteria;
        after determining that the number of measured vibrations associated with the at least one lubrication apparatus is at least the threshold number of measured vibrations associated with the selected one of the plurality of different criteria, causing the at least one lubrication apparatus to dispense lubricant;
        after causing the at least one lubrication apparatus to dispense the lubricant, waiting for a second lubrication cycle time period after the first lubrication cycle time period to expire; and
        after the second lubrication cycle time period expires, determining whether a further number of measured vibrations, associated with the at least one lubrication apparatus and measured from the time of expiry of the first lubrication cycle time period until expiry of the second lubrication cycle time period, is at least the threshold number of measured vibrations associated with the selected one of the plurality of different criteria.

2. The method of claim 1 wherein the number of measured vibrations associated with the at least one lubrication apparatus is a number of measured vibrations of the at least one lubrication apparatus, and wherein the at least one lubrication apparatus comprising at least one lubricant dispenser.

3. The method of claim 1 wherein the number of measured vibrations associated with the at least one lubrication apparatus is a number of measured vibrations measured proximate the at least one lubrication apparatus.

4. A lubrication control circuit configured to control at least one lubrication apparatus by performing steps comprising:
    determining whether a number of measured vibrations associated with the at least one lubrication apparatus satisfies a selected one of a plurality of different criteria of the at least one lubrication apparatus, wherein the plurality of different criteria are associated with respective different threshold numbers of measured vibrations associated with the at least one lubrication apparatus, and wherein the number of measured vibrations associated with the at least one lubrication apparatus satisfies the selected one of the plurality of different criteria when the number of measured vibrations associated with the at least one lubrication apparatus is at least the threshold number of measured vibrations associated with the selected one of the plurality of different criteria; and controlling the at least one lubrication apparatus according to whether the number of measured vibrations associated with the at least one lubrication apparatus satisfies the selected one of the plurality of different criteria, wherein controlling the at least one lubrication apparatus comprises:

waiting for a first lubrication cycle time period to expire;

after the first lubrication cycle time period expires, determining that the number of measured vibrations, associated with the at least one lubrication apparatus and during the first lubrication cycle time period, is at least the threshold number of measured vibrations associated with the selected one of the plurality of different criteria;

after determining that the number of measured vibrations associated with the at least one lubrication apparatus is at least the threshold number of measured vibrations associated with the selected one of the plurality of different criteria, causing the at least one lubrication apparatus to dispense lubricant;

after causing the at least one lubrication apparatus to dispense the lubricant, waiting for a second lubrication cycle time period after the first lubrication cycle time period to expire; and after the second lubrication cycle time period expires, determining whether a further number of measured vibrations, associated with the at least one lubrication apparatus and measured from the time of expiry of the first lubrication cycle time period until expiry of the second lubrication cycle time period, is at least the threshold number of measured vibrations associated with the selected one of the plurality of different criteria.

5. The lubrication control circuit of claim 4 wherein the plurality of different criteria comprises three different criteria.

6. The lubrication control circuit of claim 4 wherein controlling the at least one lubrication apparatus further comprises, in response to determining that the further number of measured vibrations is at least the threshold number of measured vibrations associated with the selected one of the plurality of different criteria, causing the at least one lubrication apparatus to dispense further lubricant.

7. The lubrication control circuit of claim 6 wherein controlling the at least one lubrication apparatus further comprises, after causing the at least one lubrication apparatus to dispense the further lubricant, repeating:

waiting for the lubrication cycle time period to expire;

after the lubrication cycle time period expires, determining whether a further number of measured vibrations, associated with the at least one lubrication apparatus and measured after causing the at least one lubrication apparatus to dispense the further lubricant, satisfies the selected one of the plurality of different criteria; and in response to determining that the further number of measured vibrations satisfies the selected one of the plurality of different criteria, causing the at least one lubrication apparatus to dispense further lubricant.

8. The lubrication control circuit of claim 4 wherein controlling the at least one lubrication apparatus further comprises, in response to determining that the further number of measured vibrations is not at least the threshold number of measured vibrations associated with the selected one of the plurality of different criteria, waiting for the further number of measured vibrations to satisfy the selected one of the plurality of different criteria.

9. The lubrication control circuit of claim 8 wherein controlling the at least one lubrication apparatus further comprises, in response to determining that the further number of measured vibrations does not satisfy the selected one of the plurality of different criteria, waiting for the further number of measured vibrations, associated with the at least one lubrication apparatus and measured from the time of expiry of the first lubrication cycle time period until expiry of the second lubrication cycle time period, to be at least the threshold number of measured vibrations associated with the selected one of the plurality of different criteria.

10. The lubrication control circuit of claim 4 wherein the circuit is further configured to measure the number of measured vibrations associated with the at least one lubrication apparatus.

11. The lubrication control circuit of claim 10 wherein the circuit is configured to measure the number of measured vibrations associated with the at least one lubrication apparatus by, at least, measuring an electrical charge accumulated in response to the number of measured vibrations associated with the at least one lubrication apparatus.

12. The lubrication control circuit of claim 11 wherein measuring the electrical charge accumulated in response to the number of measured vibrations associated with the at least one lubrication apparatus comprises measuring an electrical voltage across a capacitor associated with the selected one of the plurality of different criteria.

13. The lubrication control circuit of claim 11 comprising a source of the electrical charge.

14. The lubrication control circuit of claim 13 wherein the source of the electrical charge comprises a vibration sensor.

15. The lubrication control circuit of claim 14 wherein the number of measured vibrations associated with the at least one lubrication apparatus is a number of measured vibrations of the at least one lubrication apparatus, the at least one lubrication apparatus comprising:

at least one lubricant dispenser; and the vibration sensor.

16. The lubrication control circuit of claim 15 wherein the vibration sensor comprises a switch that closes and causes the electrical charge to accumulate in response to movement of the vibration sensor.

17. The lubrication control circuit of claim 14 wherein the vibration sensor comprises a switch that closes and causes the electrical charge to accumulate in response to movement of the vibration sensor.

18. The lubrication control circuit of claim 13 further comprising a switch configured to direct the electrical charge from the source of the electrical charge to one of a plurality of capacitors associated with respective ones of the plurality of different criteria to select the selected one of the plurality of different criteria.

19. The lubrication control circuit of claim 4 wherein the first and second lubrication cycle time periods are a selected one of a plurality of different lubrication cycle time periods of the at least one lubrication apparatus.

20. An apparatus for controlling at least one lubrication apparatus, the apparatus comprising:

a means for determining whether a number of measured vibrations associated with the at least one lubrication apparatus satisfies a selected one of a plurality of different criteria of the at least one lubrication apparatus, wherein the plurality of different criteria are associated with respective different threshold numbers of measured vibrations associated with the at least one lubrication apparatus, and wherein the number of measured vibrations associated with the at least one lubrication apparatus satisfies the selected one of the plurality of different criteria when the number of measured vibrations associated with the at least one lubrication apparatus is at least the threshold number of measured vibrations associated with the selected one of the plurality of different criteria; and a means for controlling the at least one lubrication apparatus according to whether the number of measured vibrations associated with the at least one lubrication apparatus satisfies the selected one of the plurality of different criteria, wherein the means for controlling the at least one lubrication apparatus is configured to perform steps comprising:

waiting for a first lubrication cycle time period to expire;

after the first lubrication cycle time period expires, determining that the number of measured vibrations, associated with the at least one lubrication apparatus and during the first lubrication cycle time period, is at least the threshold number of measured vibrations associated with the selected one of the plurality of different criteria;

after determining that the number of measured vibrations associated with the at least one lubrication apparatus is at least the threshold number of measured vibrations associated with the selected one of the plurality of different criteria, causing the at least one lubrication apparatus to dispense lubricant;

after causing the at least one lubrication apparatus to dispense the lubricant, waiting for a second lubrication cycle time period after the first lubrication cycle time period to expire; and after the second lubrication cycle time period expires, determining whether a further number of measured vibrations, associated with the at least one lubrication apparatus and measured from the time of expiry of the first lubrication cycle time period until expiry of the second lubrication cycle time period, is at least the threshold number of measured vibrations associated with the selected one of the plurality of different criteria.

* * * * *